Patented Sept. 8, 1942

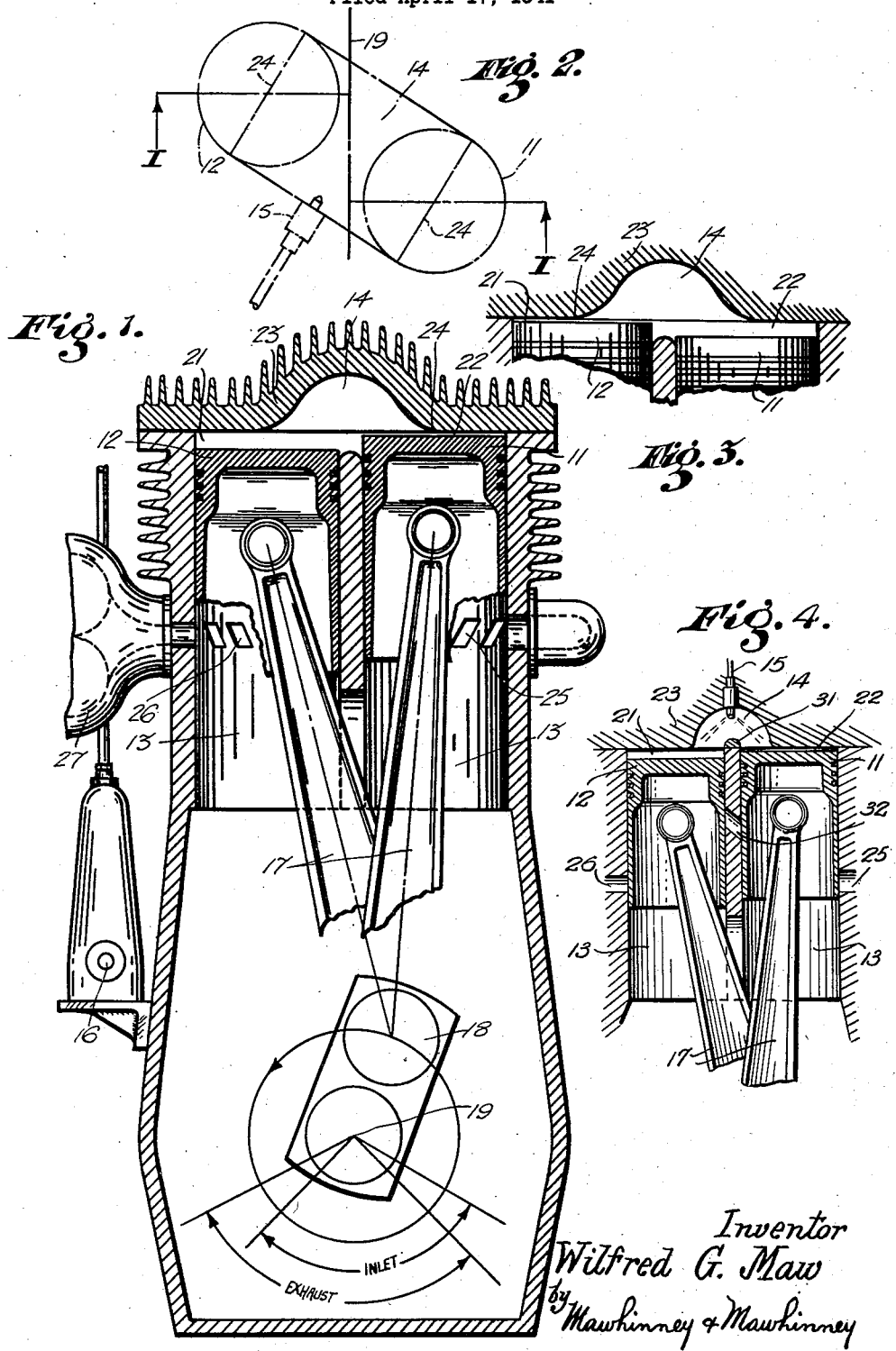

2,295,120

UNITED STATES PATENT OFFICE 2,295,120

COMPRESSION IGNITION ENGINE

Wilfred Gibson Maw, Dursley, England, assignor to R. A. Lister & Company Limited, Dursley, England Application April 17, 1941, Serial No. 389,068
In Great Britain April 4, 1940

4 Claims. (Cl. 123—53)

This invention relates to fuel-injection, compression-ignition engines, and particularly to the kind adapted to operate on the two-stroke cycle.

The main object is to provide a construction which is, in effect, of the direct-injection type and with which very complete combustion will be obtained.

A further object is to provide a combustion space which alters rapidly in shape whilst remaining of almost constant volume during the period of injection, the change of shape causing a rush of the compressed charge of air past the fuel-injector.

A still further object is to provide an engine having twin side-by-side cylinders communicating with a common combustion space into which the fuel is injected, the pistons being arranged relatively to the crankshaft so as to reach their outer (with respect to the crankshaft) dead-centre positions in succession, whereby to cause a rush of the compressed charge of air through the common combustion space while injection is taking place.

In the accompanying sheet of drawings:

Figure 1 is a diagrammatic sectional elevation of a two-stroke engine according to the invention, the upper part being a section mainly on the line I—I of Figure 2 and the lower portion an axial section;

Figure 2 is a diagrammatic plan thereof;

Figure 3 is a fragmentary view showing the pistons for a different position of the crankshaft; and Figure 4 is a view, similar to that of Figure 1, showing a modification.

In the construction shown by Figures 1 to 3, there are two pistons 11, 12 disposed in side-by-side cylinders 13 communicating with a common combustion space 14, in which is mounted an injector 15 supplied in known manner from an ordinary form of fuel pump indicated at 16. Actually, the cylinders and pistons are staggered slightly, as shown by Figure 2, to enable the big-ends of the connecting-rods 17 to be mounted beside one another upon a common crankpin 18 of the crankshaft. It will be observed that the cylinders are disposed with their axes equally offset from and on opposite sides of the crankshaft axis 19. The crankshaft rotates in the direction shown by the arrow, and the arrangement is such that the leading piston 11 reaches its outer dead-centre position (as shown by Figure 1) at approximately twenty degrees before the crankpin is in the mid-position between the cylinders, i. e., nearest to the common combustion space 14. In this latter position of the crankpin the connecting-rods will obviously be at equal inclinations to the cylinder axes and the pistons equidistant from the outer dead-centre positions, the leading piston 11 moving inwardly whilst the lagging piston 12 is still approaching the outer dead-centre position. Injection may begin at approximately the moment when the leading piston reaches its outer dead-centre position, and may cease approximately when the lagging piston (as shown by Figure 3) reaches its outer dead-centre position—i. e., forty degrees later—for the maximum injection period. (Naturally the period of injection will vary according to the load on the engine in known manner.) During this period the total volume of the combustion space will remain somewhat constant, but it will change shape rapidly, for example, in 0.0045 of a second at 1500 R. P. M., and during this period a rush of air occurs through the common portion 14 of the combustion chamber from the end 21 of the cylinder in which the piston 12 lags to the end 22 of the cylinder in which the piston 11 leads.

The common combustion space 14 is preferably formed in the cylinder head 23 as shown. It may be symmetrically disposed with respect to the two cylinders, having smoothly-curving sides which approach towards the piston heads (at the outer dead-centre positions of the latter) near diameters thereof, as indicated at 24. The injector 15 may be symmetrically disposed in the common combustion space as shown or may be turned slightly (anti-clockwise in the plan of Figure 2) to inject towards the rush of the air charge.

In the two-stroke engine shown, the cylinder in which the piston 11 leads is provided with exhaust ports 25 and the other cylinder with inlet ports 26, all the ports being controlled in the usual way by the reciprocation of the respective pistons. The timing of the valves is diagrammatically depicted in the lower portion of Figure 1. Crankcase compression may be relied upon or use may be made of a blower, as is actually indicated at 27.

The operation of the engine is as follows: Air entering through the inlet ports 26 passes along the cylinder in which the piston 12 lags, through the common combustion space 14, along the cylinder in which the piston 11 leads, and leaves by the exhaust ports 25, until the leading piston 11 closes the latter. Shortly afterwards the lagging piston 12 closes the inlet ports, and the pistons travel outwardly of the crankshaft, the one piston 11 retaining its slight lead over the other 12 until it reaches its outer dead-centre position as above-mentioned, when, or slightly before, injection begins. During the period of injection, the rush of air from the end 21 to the end 22, past the injector 15, ensures the thorough mixing of the air with the sprayed fuel and thus makes for satisfactory combustion. During the instrokes of the pistons the exhaust ports 25 are first uncovered by the leading piston 11 and the burning charge begins to exhaust. Thereupon the inlet ports 26 are opened by the lagging piston 12 and the cycle is completed.

In the modification of Figure 4 the reference numerals applied to certain parts are the same as those applied to the similar parts in Figures 1 to 3. Thus, 11 represents the leading piston, 12 the lagging piston, 13 the cylinders and 14 the portion of the combustion space which is common to the two cylinders. In this case it is of inverted-U shape in the section shown, the cylinder head 23 having a bridging portion 31 as indicated. The fuel-injector 15 is arranged over the bridging portion 31 to discharge fuel jets each side thereof as shown.

Furthermore, in the modification of Figure 4, the two cylinders are joined to one another by a passage 32 when the pistons are remote from the cylinder head. This passage 32 assists in the exhausting of the gases from the cylinder for the lagging piston 12 when the exhaust ports 25 are uncovered by the leading piston 11, and also for the charging of the cylinder for the leading piston when the inlet ports 26 are uncovered by the lagging piston.

What I claim as my invention and desire to secure by Letters Patent of the United States is:

1. A fuel-injection, compression-ignition engine having a crankshaft, twin side-by-side cylinders, a cylinder head providing a common combustion space with which both the cylinders communicate, an injector in said cylinder head adapted to inject fuel into said common space, and pistons in said cylinders arranged relatively to the crankshaft so as to reach their outer dead-centre positions in succession, whereby to cause a rush of the compressed charge of air through said common space while injection is taking place.

2. A fuel-injection, compression-ignition engine having a crankshaft, a pair of side-by-side cylinders with their axes passing on opposite sides of the crankshaft axis, a cylinder head providing a common combustion space with which both the cylinders communicate, an injector adapted to inject fuel into said common combustion space, and pistons in said cylinders connected to a common crankpin of the crankshaft, whereby one of the pistons will lead the other along its cylinder bore, the dimensions being such that the leading piston will reach its outer dead-centre position approximately 20° before said common crankpin will be mid-way between the cylinder axes.

3. A fuel-injection-compression-ignition engine having a crankshaft, a pair of side-by-side cylinders with parallel axes on opposite sides of the crankshaft axis, said cylinder axes being in a plane which is inclined to the crankshaft axis, a cylinder head providing a common combustion space with which both said cylinders communicate, an injector adapted to inject fuel into said common combustion space, and pistons in said cylinders connected to a common crankpin of said crankshaft, whereby one of the pistons will lead the other along its cylinder bore, the dimensions being such that the leading piston will reach its outer dead-centre position approximately 20° before said crankpin will be mid-way between the cylinder axes, and such that the lagging piston will reach its outer dead-centre position approximately 40° after the leading piston has reached its outer dead-centre position.

4. A fuel-injection, compression-ignition, two-stroke engine having a crankshaft, a pair of side-by-side cylinders disposed with their axes passing on opposite sides of the crankshaft axis, a cylinder head providing a common combustion space with which both the cylinders communicate, an injector adapted to inject fuel into said common combustion space, pistons in said cylinders connected to a common crankpin of the crankshaft, whereby one of the pistons will lead the other along its cylinder bore, the pistons causing a rush of the compressed charge of air through said common combustion space as the lagging piston approaches its outer dead-centre position and the leading piston begins its instroke, the cylinder for the leading piston having exhaust ports, and the other cylinder having inlet ports, and both sets of ports being controlled by the reciprocation of the respective pistons, the cylinders also being directly interconnected by a passage when the pistons are remote from said common combustion space, and a blower for supplying compressed air to the inlet ports.

WILFRED GIBSON MAW.